United States Patent [19]

Teng et al.

[11] Patent Number: 4,775,215
[45] Date of Patent: Oct. 4, 1988

[54] NONLINEAR OPTICAL DEVICES

[75] Inventors: Chia-Chi Teng, Summit; James B. Stamatoff, Westfield; Alan Buckley, Berkeley Heights, all of N.J.; Anthony F. Garito, Radnor, Pa.

[73] Assignee: Hoechst Celanese Corporation, Somerville, N.J.

[21] Appl. No.: 925,938

[22] Filed: Oct. 31, 1986

[51] Int. Cl.$^4$ ............................................. G02B 6/00
[52] U.S. Cl. ................................. 350/96.34; 350/356
[58] Field of Search ............... 350/96.11, 96.13, 96.29, 350/96.34, 353, 355, 356

[56] References Cited

U.S. PATENT DOCUMENTS

| 4,423,202 | 12/1983 | Choe | 528/336 X |
| 4,463,167 | 7/1984 | Choe et al. | 528/337 X |
| 4,607,095 | 8/1986 | Kuder | 524/606 X |
| 4,719,281 | 1/1988 | Choe | 350/356 X |

OTHER PUBLICATIONS

Pepper, David M., "Nonlinear Optical Phase Conjugation", *Optical Eng.*, vol. 21, No. 2, Mar./Apr. 1982, pp. 156–183.

Smith, P. W., "On the Physical Limits of Digital Optical Switching & Logic Ele.", *Bell Sys. Tech. J.*, No. 6, 1982, pp. 1975–1993.

*Primary Examiner*—Eugene R. LaRoche
*Assistant Examiner*—Steven J. Mottola
*Attorney, Agent, or Firm*—Depaoli & O'Brien

[57] ABSTRACT

This invention provides optical devices with an organic nonlinear optical component which is a transparent medium of a wholly aromatic polymer which exhibits a third order nonlinear optical susceptibility $\chi^{(3)}$ of at least about $1 \times 10^{-12}$ esu.

Illustrative of an invention embodiment is an ultrafast all-optical gate device with a transparent poly([benzo(1,2-d:4,5-d')bisthiazole-2,6-diyl]-1,4-phenylene) optical component which exhibits a third order nonlinear optical susceptibility $\chi^{(3)}$ of $10 \times 10^{-12}$ esu.

19 Claims, 1 Drawing Sheet

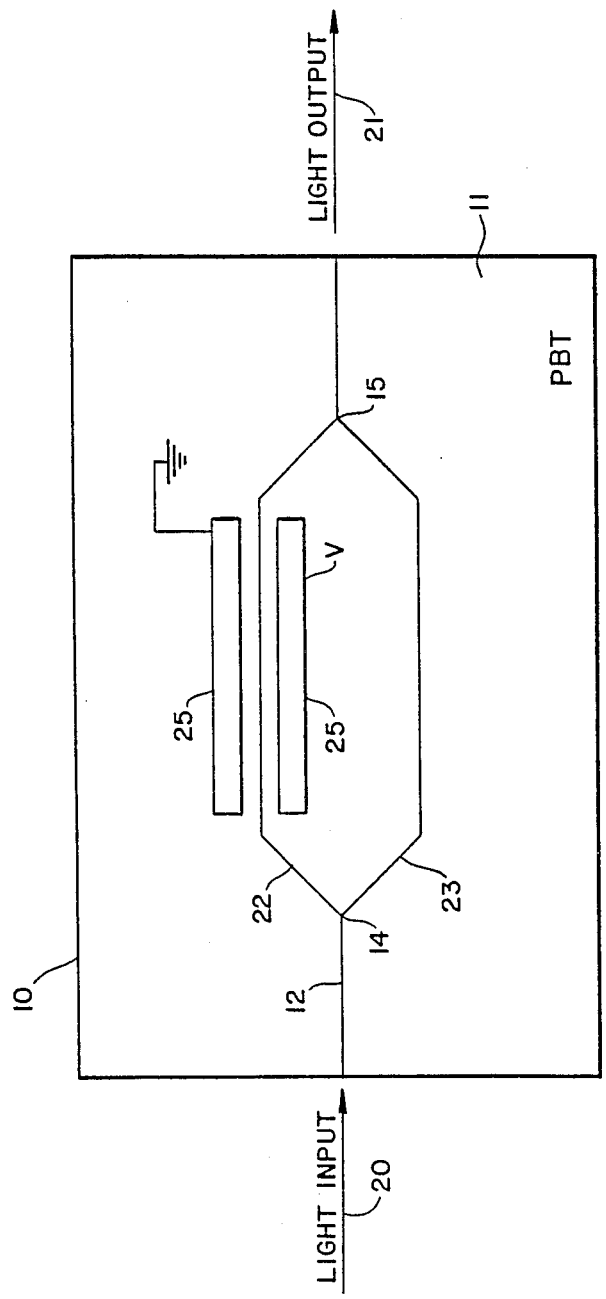

NONLINEAR OPTICAL DEVICES

This invention was made with Government support under Contract No. F49620-84-C-0110 awarded by the Department of Defense (DOD). The Government has certain rights in this invention.

DESCRIPTION OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Paper presented at the meeting are published in ACS Symposium Series 233, American Chemical Society, Washington, D.C. 1983.

Thin films of organic polymeric materials with large optical nonlinearities in combination with silicon-based electronic circuitry have potential as systems for laser modulation and deflection, information control in optical circuitry, and the like.

Novel processes occurring through third-order nonlinearity such as degenerate four wave mixing or optical bistability have potential utility in such diverse fields as optical communications and integrated circuit fabrication.

P. W. Smith in Bell System Techn. J., 6, 1975 (1982) proposes that $\chi^{(3)}(\omega_1, \omega_2, \omega_3)$, and especially the degenerate third order nonlinear susceptibility $\chi^{(3)}(-\omega, \omega, \omega)$ [defined as $\chi^{(3)}(\omega)$], be utilized through its contributions to the changes in dielectric constant $\epsilon$ with optical field strength E:

$$\epsilon = \epsilon_1(\omega) + 4\pi\chi^{(3)}(-\omega, \omega, \omega)E^2(\omega)$$

$\chi^{(3)}(\omega)$ also contributes to such well known effects as self-focusing, self-trapping and self-bending of light, degenerate four wave mixing and phase conjugation.

The theory and practice of third order nonlinear optical processes are treated in publications which include:

D. Frohlich, "Advances in Solid Physics: Festkoer Problem"; Pergamon, New York, Vol. XXI (1981).
M. D. Levenson and J. J. Song, "Coherent Nonlinear Optics", chapter 7; Springer, New York (1981).
Y. R. Shen, Rev. Mod. Phys., 48, 1 (1976).
D. M. Pepper, Opt. Eng., 21, 156 (1982).
Y. R. Shen, "The Principles of Nonlinear Optics"; John Wiley & Sons, New York (1984).

The above-recited publications are incorporated herein by reference.

There is continuing research effort to develop new nonlinear optical devices adapted for applications such as laser frequency conversion, phase-conjugate optics, information control in optical circuitry, light valves, optical switches, optical multiplexing-demultiplexing systems, and the like. The potential utility of organic materials with large optical nonlinearities for very high frequency application in optical devices contrasts with the bandwidth limitations of conventional inorganic optic and electrooptic materials.

Accordingly, it is an object of this invention to provide novel nonlinear optical devices.

It is another object of this invention to provide optical switch devices and optical modulator devices which contain an organic nonlinear optical component which exhibits third order nonlinear optical susceptibility $\chi^{(3)}$.

It is a further object of this invention to provide four wave mixing and bistable devices which contain an optically transparent medium of a polymer exhibiting a large third order nonlinear optical susceptibility $\chi^{(3)}$ response.

Other objects and advantages of the present invention shall become apparent from the accompanying description and examples.

The subject matter of the present patent application is related to that disclosed in patent application Ser. No. 708,604, filed Mar. 5, 1985; now U.S. Pat. No. 4,607,095.

DESCRIPTION OF THE INVENTION

One or more objects of the present invention are accomplished by the provision of an optical device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 $\mu$m excitation wavelength.

The term "optically transparent" as employed herein refers to a solid polymeric medium which is transparent or light transmitting with respect to incident fundamental light frequencies and harmonic light frequencies. In a laser frequency converter, a present invention nonlinear optical lens medium is transparent to both the incident and exit light frequencies.

The term "wholly aromatic" as employed herein refers to a linear polymer in which each recurring monomeric unit contributes at least one aromatic nucleus to the polymer backbone.

In another embodiment this invention provides an optical device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 $\mu$m excitation wavelength, wherein the polymer component is characterized by a recurring structural unit corresponding to the formula:

where Z is an aromatic heterocyclic radical, and Ar is a divalent aryl radical.

The term "aromatic heterocyclic" as employed herein refers to structures which are exemplified by benzimidazole, benzthiazole and benzoxazole radicals.

Illustrative of the divalent aryl radical in the above formula are $C_6$-$C_{24}$ structures which include phenylene, diphenylene, triphenylene, naphthylene, and aromatic radicals corresponding to the formula:

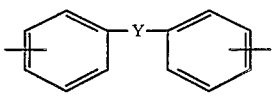

where Y is a divalent radical selected from estero, amido, azomethino, azo, azoxy, etheno, ethyno, carbonyl, sulfono, oxy and thio groups.

In the invention optical devices, the polymer component typically will have a weight average molecular weight between about 10,000–200,000, and preferably the polymer is one which exhibits thermotropic or lyotropic liquid crystalline properties.

The term "thermotropic" as employed herein refers to polymers which are liquid crystalline (i.e., anisotropic) in the melt phase.

The term "lyotropic" as employed herein refers to polymers which are liquid crystalline when dissolved in a solvent phase at a selected temperature.

In another embodiment this invention provides an optical device with an organic nonlinear optical component comprising an optically transparent medium of poly-2,2'-(m-phenylene)-5,5'-bibenzimidazole as characterized by the recurring structural unit:

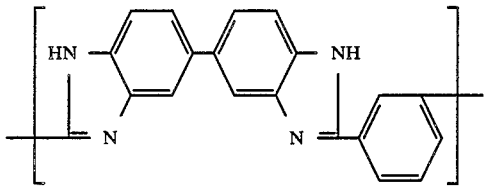

where the polymer medium exhibits a third order nonlinear optical susceptibility $\chi^{(3)}$ of at least about $1\times10^{-12}$ esu as measured at 1.91 μm excitation wavelength.

In another embodiment this invention provides an optical device with an organic nonlinear optical component comprising an optically transparent medium of poly([benzo(1,2-d:4,5-d')bisthiazole-2,6-diyl]-1,4-phenylene) as characterized by the recurring structural unit:

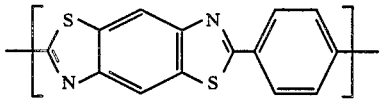

wherein the polymer medium exhibits a third order nonlinear optical susceptibility $\chi^{(3)}$ of at least about $10\times10^{-12}$ esu as measured at 1.91 μm excitation wavelength.

In another embodiment this invention provides an optical device with an organic nonlinear optical component comprising an optically transparent medium of poly([benzo(1,2-d:4,5-d')bisoxazole-2,6-diyl]-1,4-phenylene) as characterized by the recurring structural unit:

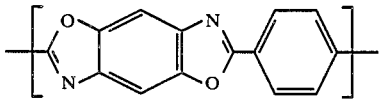

wherein the polymer medium exhibits a third order nonlinear optical susceptibility $\chi^{(3)}$ of at least about $1\times10^{-12}$ esu as measured at 1.91 μm excitation wavelength.

Wholly Aromatic Polymer Component

Wholly aromatic polymers which contain recurring aromatic heterocyclic structures such as benzimidazole, benzthiazole or benzoxazole are described in U.S. Pat. Nos. 3,313,783; 3,681,297; 3,987,015; 4,051,108; 4,108,835; 4,359,567; 4,377,546; 4,423,202; 4,463,167; 4,533,693; 4,581,437; and references cited therein; incorporated herein by reference.

The polymer component of the present invention optical devices can be in the form of a thin or thick transparent film, such as a coating on an optical substrate, or as a sheet in a laminate. The polymer can also be in the form of a transparent fiber, rod or molded structure.

A present invention wholly aromatic polymer can be cast, molded, or extruded in the melt phase, or it can be dissolved in a solvent to form a solution or dope for spraying, casting or spinning procedures.

Suitable solvents for polymer dissolution include N,N-dimethylacetamide, N-methylpyrrolidone, hexamethylphosphorictriamide, decalin, xylene, tetrahydrofuran, pentafluorophenol, hexafluoroisopropanol, and the like.

With some wholly aromatic polymers such as poly([benzo(1,2-d:4,5-d')bisthiazole-2,6-diyl]-1,4-phenylene, the third order nonlinear optical susceptibility $\chi^{(3)}$ response is enhanced if the polymer molecules are uniaxially oriented, such as by the application of an external field.

The term "external field" as employed herein refers to an electric, magnetic or mechanical stress field which is applied to a substrate of mobile polymer molecules, to induce dipolar alignment of the molecules parallel to the field.

Illustrative of an external field induced molecular orientation of a liquid crystalline polymer, in one method a thin film of the liquid crystalline polymer is cast between electrode plates. The liquid crystalline polymer substrate then is heated to a temperature between about the glass transition temperature and the isotropic clearing point. An ac electric field at a frequency of about 1 KHz is applied (e.g., at a field strength between about 400–100,000 V/cm) for a period sufficient to align all of the macromolecules in a unidirectional configuration parallel to the transverse field. Typically the orientation period will be in the range between about one second and one hour, as determined by factors such as polymer structure and field strength.

When the orientation of macromolecules is complete, the liquid crystalline polymer substrate is cooled below its glass transition temperature, while the substrate is still under the influence of the applied ac electric field. In this manner the uniaxial molecular orientation of the liquid crystalline polymer is immobilized in a rigid structure.

In addition to enhanced nonlinear optical response, a wholly aromatic polymeric medium with a uniaxial molecular configuration often has improved optical clarity.

Further, a wholly aromatic polymeric medium with a uniaxial molecular orientation structure usually exhibits exceptional mechanical properties, as compared to the same medium which has a random molecular configuration rather than a unidirectional molecular configuration.

A molecularly oriented polymeric thin sheet or film is characterized by a high tensile modulus. If the molecularly oriented polymer is in the form of a coating or laminate sheet which is in contact with an optical glass surface, there is a tenacious self-adhesion between polymer and the surface of contact, as compared with the same polymer medium which has a random molecular configuration.

In general, a wholly aromatic polymer has the advantages of superior stability properties and processability as compared to other organic nonlinear optical materials for application in optical devices. For example, the synthesis of a wholly aromatic polymer does not require a crystal state polymerization process in the manner of polydiacetylene.

Also, in comparison to conventional inorganic nonlinear optical components, a wholly aromatic polymer is relatively impervious to atmospheric and thermoxidative conditions, and can be shaped into a superior optical component with facility and economy.

Optical Device Construction

In another embodiment this invention provides an optical light switching device device with an organic nonlinear optical component comprising an optically transparent medium of a polymer selected from polybenzimidazole, polybenzthiazole and polybenzoxazole which exhibits a third order nonlinear optical suscetibillity $\chi^{(3)}$ of at least about $1 \times 10^{-12}$ esu as measured at 1.91 μm excitation wavelength.

In another embodiment this invention provides an optical light modulator device with an organic nonlinear optical component comprising an optically transparent medium of a polymer selected from polybenzimidazole, polybenzthiazole and polybenzoxazole which exhibits a third order nonlinear optical susceptibility $\chi^{(3)}$ of at least about $1 \times 10^{-12}$ esu as measured at 1.19 μm excitation wavelength.

In a further embodiment this invention provides an optical device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 μm excitation wavelength, wherein the polymer component is characterized by a recurring structural unit corresponding to the formula:

wherein Z is an aromatic heterocyclic radical, and Ar is a divalent aryl radical; and wherein the optical device is a laser frequency converter, an optical Kerr effect device, an electrooptical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, or an optical parametric device.

The theory of nonlinear harmonic generation by frequency modulation of coherent light is elaborated by A. F. Garito et al in Chapter 1, "Molecular Optics: Nonlinear Optical Properties of Organic And Polymeric Crystals"; ACS Symposium Series 233 (1983).

Optical harmonic generating devices are described in Science, 216 (1982); and in U.S. Pat. Nos. 3,234,475; 3,395,329; 3,694,055; 3,858,124; and 4,536,450.

Optical Kerr effect devices are described in U.S. Pat. Nos. 4,428,873 and 4,515,429; and references cited therein.

Degenerate four wave mixing optical devices are discussed by Y. R. Shen in Chapter 15, "The Principles of Nonlinear Optics"; John Wiley & Sons, New York (1984). A nonresonant degenerate four wave mixing mirror device is described by J. Feinberg et al in Optics Letters, 5 (12), 519 (1980).

An optical interferometric waveguide gate device is described by A. Lattes et al in IEEE J. Quantum Electronics, QE-19 (11), 1718 (1983).

A wide-band electrooptical guided-wave analog-to-digital converter device is described by R. A. Becker et al in Proceedings Of The IEEE, 72 (7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30 (6); 280 (1977) and in IEEE Spectrum, June 1981.

Optical parametric devices are described in U.S. Pat. Nos. 3,371,220; 3,530,301; and 3,537,020.

A present invention optical device comprises a novel combination of a wholly aromatic polymer nonlinear optical component in a light switching or modulating system.

A present invention optical device can be achieved by constructing one of the optical devices described in the technical literature, except that a wholly aromatic polymer is utilized as the nonlinear optical component.

FIG. 1 is a schematic drawing of an integrated optical Mach-Zehnder interferometer modulator fabricated from single-mode channel waveguides in a film of molecularly oriented poly([benzo(1,2-d:4,5-d')bisthiazole-2,6-diyl]-1,4-phenylene) (PBT). This type of interferometer-design is described in Proceedings of the IEEE, 72 (7), 802 (1984); and Appl. Phys. Lett., 26, 562 (1976).

Referring to FIG. 1, interferometer 10 consists of a transparent nonlinear optical PBT film component 11 which contains a single-mode input optical waveguide 12 which Y branches at 14 to split the optical power from light input 20 into two equal components before recombining through Y branches at 15 and exiting as light output 21. The channel contains PBT polymer in which ions have been diffused so that the index of refraction of the modified PBT polymer within the channel slightly exceeds the index of refraction of the PBT film which forms the substrate.

In the absence of applied voltage V, the light components recombine in phase and form the lowest order mode in the output waveguide yielding a maximum output.

If voltage V is applied to waveguide branch 22 via copolanar electrodes 25, the phase velocity of light propagating in waveguide branch 22 is altered due to the nonlinear $\chi^{(3)}$ electrooptic effect. This results in a phase difference between the light in waveguide branch 22 and in waveguide branch 23 when they recombine at 15.

When the two light waves are π radians out of phase, the two recombining light components form the second order mode which the single-mode waveguide cannot support. The light radiates into the PBT substrate so that there is no resultant yield as light output 21.

Coating an optical fiber with a polymer is an example of another device element which can utilize this class of wholly aromatic polymers. For example, a multimode thick glass fiber of diameter greater than 10 microns may be drawn through a PBT lyotropic dope and coated with the polymer. The index of refraction of the glass fiber is less than that of the PBT polymer. The index of the polymer is substantially greater than that of air. As a result, light which is guided into the glass fiber will extend into the polymer upon entering the polymer cladded region. Light will be confined to the cladded fiber because the index of refraction of the polymer exceeds that of air. The effective index of refraction for the cladded fiber becomes, for any particular mode, an average of the index of the glass and of the polymer cladding. The average depends upon the thicknesses of the glass and polymer and the particular optical mode. Due to the optical Kerr and electrooptical Kerr effects, the cladded fiber becomes an active optical element. For example, the index of refraction will depend upon the intensity of light which is guided in the cladded fiber. This will result in a phase shift dependence of the guided wave which depends upon light intensity. This may be used with another optical fiber to construct an optical limiter based upon a Mach-Zehnder type design.

As another example, the cladded fiber may be subjected to intense non-guided optical beams of light so that the guided wave phase may be altered by an external beam. Combined with a Mach-Zehnder type design, this effect may be used to construct a wholly optical light switch. As a further example, the optical fiber may be spooled on an electrode. The spool may be potted and coated with another electrode. Using the electro-optical Kerr effect and the very great length of the fiber in the spool, the phase of a guided light beam may be electrooptical controlled.

The following examples are further illustrative of the present invention. The components and specific ingredients are presented as being typical, and various modifications can be derived in view of the foregoing disclosure within the scope of the invention.

EXAMPLE I

This Example illustrates the preparation of a polybenzthiazole polymer in accordance with a general procedure described in U.S. Pat. Nos. 4,225,700 and 4,487,735.

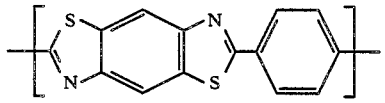

A mixture of 2,5-diamino-1,4-benzenedithiol dihydrochloride (6.38 g, 26 mmole) and 325 g of 85% polyphosphoric acid is stirred at room temperature under nitrogen for 3 hours, and then heated at 70° C. until dehydrochlorination is completed.

Terephthalic acid (4.33 g, 26 mmole) and 135 g of polyphosphoric acid are added, and the reaction mixture is heated gradually to 175° C. over a period of 7 hours, and then heated at 175° C. for 9 hours.

The reaction product mixture is diluted with methanesulfonic acid and poured into methanol to precipitate the polymer. The polymer precipitate is washed with ammonium hydroxide and with water. The polymer product is freeze-dried, and then dried in a vacuum oven to provide about 6.9 g (99% yield) of poly([benzo(1,2-d:4,5-d')bisthiazole-2,6-diyl]-1,4-phenylene).

The polymer has an intrinsic viscosity of about 11.3 dl/g in methanesulfonic acid at 30° C., and a weight average molecular weight of about 18,000.

EXAMPLE II

This Example illustrates the preparation of polybenzimidazole polymers in accordance with process embodiments described in U.S. Pat. No. 4,463,167.

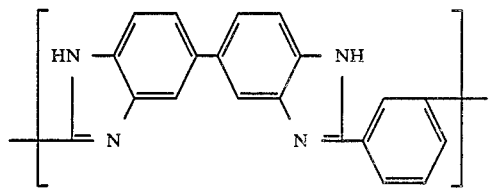

Into a three neck flask equipped with a nitrogen inlet and outlet, mechanical stirrer and a condenser are placed 23.33 g (0.1089 mole) of 3,3',4,4'-tetraaminobiphenyl, 34.67 g (0.1089 mole) of diphenyl isophthalate and 0.3 g of triphenylphosphite. The flask is degassed and then filled with nitrogen. The degassing is repeated at least three times. The mixture is heated rapidly with stirring to 225° C. The stirring is stopped, and the temperature of the reaction mixture is raised to 270° C. and held at that temperature of 1.5 hours. The resulting foamed product is cooled to room temperature and then is ground.

The ground prepolymer is placed in a flask and after the degassing step is repeated the prepolymer is heated at 340° C. for one hour.

The resulting poly-2,2'-(m-phenylene)-5,5'-bibenzimidazole exhibits a weight average molecular weight of 144,027, and an inherent viscosity of 0.95 dl/g when measured in a concentration of 0.4 g of the polybenzimidazole in 100 ml of 97% sulfuric acid.

A polybenzimidazole is prepared in accordance with the procedure described above, except that no catalyst is employed.

The inherent viscosity of the polybenzimidazole thus produced is 0.56 dl/g when measured in a concentration of 0.4 g of the polybenzimidazole in 100 ml of 97% sulfuric acid at 25° C. The polymer has a weight average molecular weight of 101,700.

EXAMPLE III

This Example illustrates the preparation of a polybenzoxazole polymer in accordance with a process described in U.S. Pat. No. 4,423,202.

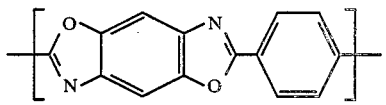

4,6-Diaminoresorcinol dihydrochloride (100.99 g, 0.474 mole) and pulverized terephthaloyl dichloride (96.23 g, 0.474 mole) are placed under nitrogen in a 5 liter resin flask. Deoxygenated polyphosphoric acid is transferred under nitrogen into the flask. The mixture is stirred at 60° C. for 16 hours, and then at 90° C. for 5 hours to dehydrochlorinate. The following heating stages are used for the polymerization: 130° C. for three hours, 150° C. for 16 hours, 170° C. for three hours, 185° C. for three hours, and finally 200° C. for 48 hours.

The reaction mixture is poured into 11.4 liters of methanol to precipitate the polymer. The polymer precipitate is recovered by filtration, washed with methanol, and dried at 100° C.

The poly[(benzo(1,2-d:4,5-d')bisoxazole-2,6-diyl]-1,4-phenylene) polymer has an inherent viscosity of 3-3.5 dl/g at a concentration of 0.2 weight/volume percent in methanesulfonic acid at 25° C.

EXAMPLE IV

This Example illustrates the measurement of the third order nonlinear optical susceptibility $\chi^{(3)}$ of wholly aromatic polymers.

The optical system is similar to that described in Phys. Rev. Lett., 50, 350 (1983) and Phys. Rev., B28, 6766 (1983) by C. C. Teng and A. F. Garito.

The apparatus consists of a pulsed Nd:YAG Q-switched laser as a pump source for a compressed hydrogen Raman cell yielding an output laser beam at 1.907 μm from the first Stokes line. The output beam is then divided into two optical paths: the reference path to eliminate signal instabilities due to input beam power fluctuations, and the sample path to provide the fundamental beam for third harmonic generation.

The sample is located on a computer controlled rotational stage for obtaining the Maker fringes of the third harmonic signal. The measurement is relative to glass which has a third order optical susceptibility $\chi_G^{(3)}(-3\omega; \omega,\omega,\omega) = 4.67 \times 10^{-14}$ esu. By comparing the third harmonic signal from the sample $I_S^{3\omega}$ with that from glass $I_G^{3\omega}$, the third order optical susceptibility $\chi_S^{(3)}(-3\omega; \omega,\omega,\omega)$ of the sample is evaluated according to:

$$\frac{I_S^{3\omega}}{I_G^{3\omega}} = \left(\frac{\chi_S^{(3)} I_C^S}{\chi_G^{(3)} I_C^G}\right)^2 \left(\frac{I_S^\omega}{I_G^\omega}\right)^3$$

where $I_C^S$ and $I_C^G$ are the coherence lengths of the sample and glass, respectively:

$$I_C = \frac{\lambda}{6(n^{3\omega} - n^\omega)}$$

$I_S$ and $I_G$ are the input beam intensities for the sample and glass third harmonic generation, respectively.

A poly-2,2'-(m-phenylene-5,5'-bibenzimidazole(PBI) thin film (about 50 μm) is prepared by dissolving 15% of the PBI polymer in N,N-dimethylacetamide with 2% of LiCl, and casting the solution onto a substrate. A thin film forms and separates from the substrate after the solvent evaporates.

A poly([benzo(1,2-d:4,5-d')bisthiazole-2,6-diyl]-1,4-phenylene) (PBT) film is prepared from a PBT polymer/polyphosphoric acid dope by drawing to impart uniaxial orientation.

Absorption spectra indicate that the samples are transparent at the fundamental optical wavelength (1.907 μm) and the third harmonic wavelength (0.636 μm).

For the 50 m thick PBI film, the coherence length $I_G^S$ of the thin film is estimated to be about 1/6 of the coherence length $I_C^G$ of glass ($I_C^G = 16.72$ μm). The third order optical susceptibility $\chi_S$ of the PBI film is determined as $0.8 \pm 0.5 \times 10^{-12}$ esu. For the PBT film, the coherence length is approximated as 0.3-0.6 μm. The $\chi_S$ of the PBT film obtained is $50-100 \times 10^{-12}$ esu, which is two orders of magnitude larger than that of the PBI film.

A poly([benzo(1,2-d:4,5-d')bisoxazole-2,6-diyl]-1,4-phenylene) (PBO) film is prepared from a PBO/polyphosphoric dope following the procedure described above fo PBT. The third order nonlinear optical susceptibility $\chi^{(3)}$ properties of a PBO film are similar to those observed for a PBT film.

The experimental results described hereinabove for PBI and PBT films are reported by A. F. Garito and C. C. Teng in SPIE O-E LASE 86; "Nonlinear Optics & Application", vol. 613, SPIE Proceedings, Washington, D.C., April 1986.

A PBT, PBI or PBO film prepared by a procedure as described above can be utilized as the nonlinear optical component 11 of the optical device illustrated in FIG. 1.

What is claimed is:

1. An optical device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 μm excitation wavelength, wherein the polymer component is characterized by a recurring structural unit corresponding to the formula:

where Z is an aromatic heterocyclic radical, and Ar is a divalent aryl radical.

2. An optical device in accordance with claim 1 wherein the polymer component is a liquid crystalline polymer.

3. An optical device in accordance with claim 1 wherein the polymer component has a weight average molecular weight between about 10,000-200,000.

4. An optical device in accordance with claim 1 wherein the Z radical in the formula contains a benzimidazole structure.

5. An optical device in accordance with claim 1 wherein the Z radical in the formula contains a benzthiazole structure.

6. An optical device in accordance with claim 1 wherein the Z radical in the formula contains a benzoxazole structure.

7. A laser frequency converter device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 μm excitation wavelength, wherein the polymer component is characterized by a recurring structural unit corresponding to the formula:

where Z is an aromatic heterocyclic radical, and Ar is a divalent aryl radical.

8. An optical Kerr effect device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 μm excitation wavelength, wherein the polymer component is characterized by a recurring structural unit corresponding to the formula:

—Z—Ar— where Z is an aromatic heterocyclic radical, and Ar is a divalent aryl radical.

9. An electrooptical Kerr effect device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 μm excitation wavelength, wherein the polymer component is characterized by a recurring structural unit corresponding to the formula:

$-[Z-Ar]-$ where Z is an aromatic heterocyclic radical, and Ar is a divalent aryl radical.

10. A four wave mixing optical device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 μm excitation wavelength, wherein the polymer component is characterized by a recurring structural unit corresponding to the formula:

$-[Z-Ar]-$ where Z is an aromatic heterocyclic radical, and Ar is a divalent aryl radical.

11. An optical interferometric waveguide gate device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 μm excitation wavelength, wherein the polymer component is characterized by a recurring structural unit corresponding to the formula:

$-[Z-Ar]-$ where Z is an aromatic heterocyclic radical, and Ar is a divalent aryl radical.

12. A wide-band electrooptical guided-wave analog-to-digital converter device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 μm excitation wavelength, wherein the polymer component is characterized by a recurring structural unit corresponding to the formula:

$-[Z-Ar]-$ where Z is an aromatic heterocyclic radical, and Ar is a divalent aryl radical.

13. An all-optical multiplexer device with an organic nonlinear optical component comprising an optically transparent medium of a wholly aromatic polymer which exhibits a third order nonlinear optical susceptibiity $\chi^{(3)}$ of at least about $1 \times 10^{-12}$ esu as measured at 1.91 μm excitation wavelength, wherein the polymer component is characterized by a recurring structural unit corresponding to the formula:

$-[Z-Ar]-$ where Z is an aromatic heterocyclic radical, and Ar is a divalent aryl radical.

14. A multiplexer device in accordance with claim 13 which is in combination with a demultiplexer device.

15. An all-optical demultiplexer device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 μm excitation wavelength, wherein the polymer component is characterized by a recurring structural unit corresponding to the formula:

$-[Z-Ar]-$ where Z is an aromatic heterocyclic radical, and Ar is a divalent aryl radical.

16. A demultiplexer device in accordance with claim 15 which is in combination with a multiplexer device.

17. An optical bistable device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 μm excitation wavelength, wherein the polymer component is characterized by a recurring structural unit corresponding to the formula:

$-[Z-Ar]-$ where Z is an aromatic heterocyclic radical, and Ar is a divalent aryl radical.

18. An optical parametric device with an organic nonlinear optical component comprising an optically transparent medium of a wholly aromatic polymer which exhibits a third order nonlinear optical susceptibility $\chi^{(3)}$ of at least about $1 \times 10^{-12}$ esu as measured at 1.91 μm excitation wavelength, wherein the polymer component is characterized by a recurring structural unit corresponding to the formula:

$-[Z-Ar]-$ where Z is an aromatic heterocyclic radical, and Ar is a divalent aryl radical.

19. An optical fiber which is clad with a transparent coating comprising a wholly aromatic polymer which exhibits a third order nonlinear optical susceptibility $\chi^{(3)}$ of at least about $1 \times 10^{-12}$ esu as measured at 1.91 μm excitation wavelength, wherein the polymer is characterized by a recurring structural unit corresponding to the formula:

$-[Z-Ar]-$ where Z is an aromatic heterocyclic radical, and Ar is a divalent aryl radical.

* * * * *